(12) United States Patent
Ozawa et al.

(10) Patent No.: US 10,000,629 B2
(45) Date of Patent: Jun. 19, 2018

(54) RESIN COMPOSITION WHOSE LUBRICITY UNDER WET CONDITIONS IS MAINTAINED

(75) Inventors: Hitoshi Ozawa, Himeji (JP); Tatsuo Ohtani, Himeji (JP); Yo Yamauchi, Himeji (JP)

(73) Assignee: SUMITOMO SEIKA CHEMICALS CO., LTD., Kako-gun (JP)

( * ) Notice: Subject to any disclaimer, the term of this patent is extended or adjusted under 35 U.S.C. 154(b) by 0 days. days.

(21) Appl. No.: 13/380,214

(22) PCT Filed: Jun. 25, 2010

(86) PCT No.: PCT/JP2010/060845
§ 371 (c)(1),
(2), (4) Date: Dec. 22, 2011

(87) PCT Pub. No.: WO2010/150875
PCT Pub. Date: Dec. 29, 2010

(65) Prior Publication Data
US 2012/0094880 A1    Apr. 19, 2012

(30) Foreign Application Priority Data
Jun. 26, 2009  (JP) ................................ 2009-152450

(51) Int. Cl.
*C08L 23/02* (2006.01)
*C08G 18/08* (2006.01)
(Continued)

(52) U.S. Cl.
CPC .......... *C08L 23/02* (2013.01); *C08G 18/0895* (2013.01); *C08G 18/3206* (2013.01);
(Continued)

(58) Field of Classification Search
CPC ............ C08G 18/0895; C08G 18/3206; C08G 18/4833; C08L 23/02; C08L 23/06; C08L 23/10; C08L 25/06
(Continued)

(56) References Cited

U.S. PATENT DOCUMENTS

| 4,381,293 A | 4/1983 | Michel |
| 2009/0302271 A1 | 12/2009 | Dobashi et al. |

FOREIGN PATENT DOCUMENTS

| JP | 54-094961 A | 7/1979 |
| JP | 8-280952 A | 10/1996 |

(Continued)

OTHER PUBLICATIONS

Machine translation of JP 08-280952. Oct. 1996.*

(Continued)

*Primary Examiner* — John E Uselding
(74) *Attorney, Agent, or Firm* — Westerman, Hattori, Daniels & Adrian, LLP

(57) ABSTRACT

Provided is a resin composition that will suffer from little drop of lubricity and will offer good touch feeling even if it is used repeatedly. A resin composition superior in lubricity and touch feeling is produced by melt-mixing a water-soluble polyethylene oxide having a viscosity average molecular weight of 1,000,000 to 6,000,000, a modified polyalkylene oxide obtainable by reacting a polyalkylene oxide, a diol compound, and a diisocyanate compound together, and a thermoplastic resin together.

5 Claims, 1 Drawing Sheet

(51) Int. Cl.

| | |
|---|---|
| *C08G 18/32* | (2006.01) |
| *C08G 18/48* | (2006.01) |
| *C08G 18/66* | (2006.01) |
| *C08G 18/75* | (2006.01) |
| *C08L 23/06* | (2006.01) |
| *C08L 23/10* | (2006.01) |
| *C08L 25/06* | (2006.01) |
| *C08L 71/02* | (2006.01) |
| *C08L 75/04* | (2006.01) |
| *C08L 75/08* | (2006.01) |
| *C08L 51/00* | (2006.01) |
| *C08L 53/00* | (2006.01) |

(52) U.S. Cl.
CPC ..... *C08G 18/4833* (2013.01); *C08G 18/4837* (2013.01); *C08G 18/6674* (2013.01); *C08G 18/758* (2013.01); *C08L 23/06* (2013.01); *C08L 23/10* (2013.01); *C08L 25/06* (2013.01); *C08L 71/02* (2013.01); *C08L 75/04* (2013.01); *C08L 75/08* (2013.01); *C08L 51/003* (2013.01); *C08L 53/00* (2013.01); *C08L 2205/03* (2013.01)

(58) Field of Classification Search
USPC .......................................................... 524/197
See application file for complete search history.

(56) References Cited

FOREIGN PATENT DOCUMENTS

| | | | |
|---|---|---|---|
| JP | 9-502632 | A | 3/1997 |
| JP | 11-106502 | A | 4/1999 |
| JP | 2004-509207 | A | 3/2004 |
| JP | 2006-328219 | A | 12/2006 |
| JP | 2007-131811 | A | 5/2007 |
| WO | 93/16135 | A1 | 8/1993 |
| WO | 94/20561 | A1 | 9/1994 |
| WO | 2004/026953 | A1 | 4/2004 |
| WO | 2007/111232 | A1 | 10/2007 |

OTHER PUBLICATIONS

International Search Report of PCT/JP2010/060845, dated Sep. 28, 2010.

Chinese Office Action dated Oct. 26, 2012 issued in corresponding Chinese Patent Application No. 201080028551.9, (7 pages).

Notification of Transmittal of Translation of the International Preliminary Report on Patentability (Form PCT/IB/338) of International Application No. PCT/JP2010/060845 dated Feb. 2, 2012 with forms PCT/IB/373, PCT/ISA/237 and PCT/IB/326.

Extended European Search Report dated Sep. 18, 2014, issued in corresponding European Patent Application No. 10792193.4 (30 pages).

\* cited by examiner

RESIN COMPOSITION WHOSE LUBRICITY UNDER WET CONDITIONS IS MAINTAINED

TECHNICAL FIELD

The present invention relates to a resin composition whose lubricity under wet conditions is maintained. More particularly, the present invention relates to a resin composition obtainable by mixing a water-soluble resin, a modified polyalkylene oxide, and a thermoplastic resin together.

BACKGROUND ART

There has heretofore been proposed a razor blade cartridge in which a water-soluble resin such as oxidized polyethylene has attached, penetrated, or dispersed to a part of a razor blade cartridge made of plastic in order to reduce the resistance between a part of a razor and the face (Patent Document 1).

Moreover, some composites in which mixing of a water-soluble resin and a water-absorbing resin allows a water-absorbing polymer to swell and various auxiliary agents to come off upon immersion in water may also be used as a smoother for wet shaving (Patent Document 2).

These products utilize impartation of lubricity to the surface of a resin caused by elution of a water-soluble resin under wet conditions. In these products, however, the compatibility between a water-soluble resin and a thermoplastic resin or between a water-soluble resin, a water-absorbing resin and a thermoplastic resin is low, so that the water-soluble resin is merely dotted on the surface of a resin composition. Therefore, although they are superior in lubricity at the initial stage, i.e. at the beginning of use, the water-soluble resin is lost during repetitive use, so that the lubricity will become lost.

A polymer composite to be used for wet shaving instruments, medical instruments, and so on has been disclosed (Patent Document 3). This polymer composite contains a water-insoluble polymer and a water-sensitive copolymer produced by polymerizing an alkylene oxide monomer with an epoxy functional monomer and maintains its lubricating property after repetitive use.

Even if an epoxy functional group is introduced into a polyalkylene oxide, however, the compatibility with a water-insoluble polymer is not enough and therefore the prevention of a water-soluble resin from coming off has been demanded in order to further maintain lubricity.

Moreover, since a water-soluble resin develops slime under wet conditions, improvement in touch feeling under wet conditions also has been demanded.

PRIOR ART DOCUMENTS

Patent Documents

Patent Document 1: JP 54-94961 A
Patent Document 2: JP 9-502632 T
Patent Document 3: JP 2004-509207 T

SUMMARY OF THE INVENTION

Problem to be Solved by the Invention

An object of the present invention is to provide a resin composition that will suffer from little drop of lubricity and will offer good touch feelings even if it is used repeatedly.

Means for Solving the Problem

The present inventors studied earnestly in order to solve the above-described problem and found that a resin composition containing a water-soluble polyethylene oxide (A), a modified polyalkylene oxide (B), and a thermoplastic resin (C) does not lose its lubricity even if it is used repeatedly and has good touch feeling. Thus, they have accomplished the present invention.

That is, the present invention relates to a resin composition that maintains superior lubricity and superior touch feeling even if it is used repeatedly. More particularly, the present invention relates to a resin composition produced by mixing a water-soluble polyethylene oxide (A) having a viscosity average molecular weight of 1,000,000 to 6,000,000, a modified polyalkylene oxide (B) obtainable by reacting a polyalkylene oxide, a diol compound, and a diisocyanate compound together, and a thermoplastic resin (C) together.

Effects of the Invention

Resin compositions obtained according to the present invention will not lose their lubricity or touch feeling even if used repeatedly and can be used widely for wet shaving instruments represented by razors, medical instruments such as catheters, ship bottom paints, and so on.

MODE FOR CARRYING OUT THE INVENTION

Figure 1:
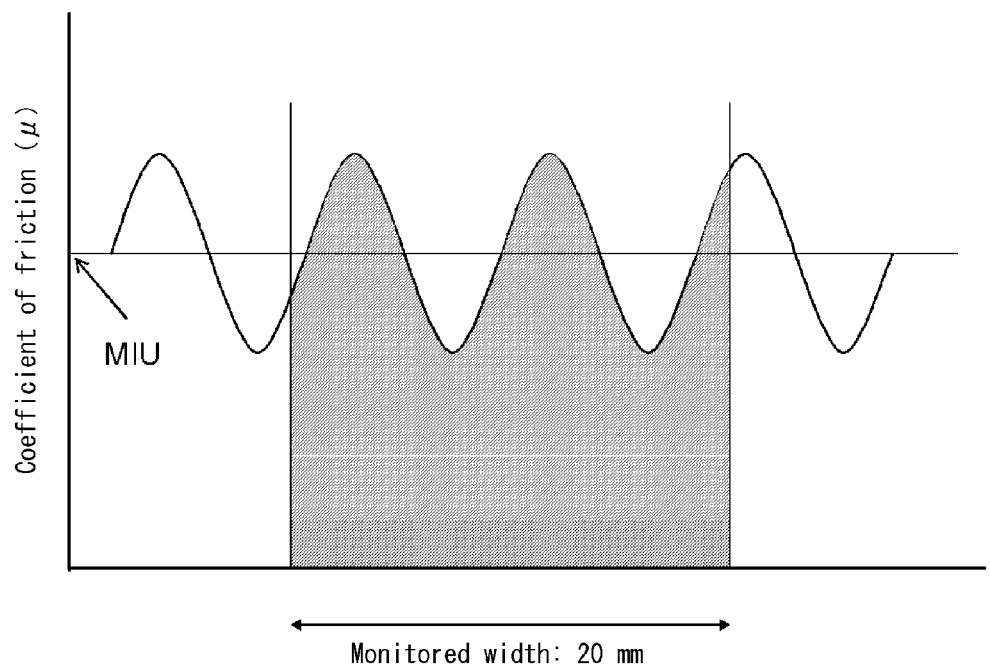
FIG. 1 is a schematic view illustrating a method for determining mean coefficient of friction (MIU).

The resin composition of the present invention is obtained by mixing a water-soluble polyethylene oxide, a modified polyalkylene oxide, and a thermoplastic resin together.

The water-soluble polyethylene oxide is a water-soluble resin produced by polymerizing an ethylene oxide and is generally commercially available (for example, "PEO®" produced by Sumitomo Seika Chemicals Co., Ltd.).

The viscosity average molecular weight of the polyethylene oxide is preferably within the range of 1,000,000 to 6,000,000, and more preferably 2,000,000 to 5,000,000.

It is undesirable that the viscosity average molecular weight is less than 1,000,000 because if so, initial lubricity is poor. It is undesirable that the viscosity average molecular weight exceeds 6,000,000, because if so, melt viscosity becomes so high that compatibility with the thermoplastic resin becomes poor and therefore it is difficult to maintain lubricity at the time of repetitive use.

The modified polyalkylene oxide to be used in the present invention is obtainable by reacting a polyalkylene oxide, a diol compound, and a diisocyanate compound together and has thermoplasticity. Therefore, it has good compatibility with both a polyethylene oxide and a thermoplastic resin.

Moreover, the modified polyalkylene oxide has a water absorption ability as low as 15 to 40 [g/g], and when a resin composition is immersed in water, the swelling ratio of a gel itself is small and desorption thereof fails to occur.

Furthermore, since the modified polyalkylene oxide fails to have ionicity like polyethylene oxides, it exhibits a water absorption ability even to aqueous solutions other than water that contain salts or various chemicals which is as high as the water absorption ability to water.

It is undesirable that the water absorption ability of the modified polyalkylene oxide is less than 15 [g/g] because if so, wettability becomes low when a resin composition is formed. It is undesirable that the water absorption ability exceeds 40 [g/g] because if so, the proportion of water-soluble components increases and slimy feeling is enhanced.

The modified polyalkylene oxide to be used in the present invention also contains 10% or more of water-soluble components and its lubricity is improved also by such water-soluble components.

Since general water-soluble resins such as those of polyacrylic acid series and those of starch series do not have thermoplasticity, they have problems such as that they do not dissolve with thermoplastic resins even if they are melt-mixed with each other, that a water-absorbing gel of a resin composition desorbs when the resin composition is immersed in water, and that the water absorption ability is reduced with salts or various chemicals. In addition, such a resin is low in proportion of water-soluble components and therefore makes no contribution to improvement in lubricity when incorporated in a resin composition, which is undesirable.

As the polyalkylene oxide, polyalkylene oxides having ethylene oxide groups in an amount of 90% by weight or more are preferred, and polyalkylene oxides having ethylene oxide groups in an amount of 95% by weight or more are more preferred.

It is undesirable that the amount of ethylene oxide groups is less than 90% by weight because if so, the compatibility with a water-soluble polyethylene oxide becomes poor, resulting in a large drop of lubricity at the time of repetitive use.

As the polyalkylene oxide, polyalkylene oxides having a number average molecular weight of 5,000 to 50,000 are preferred, and polyalkylene oxides having a number average molecular weight of 10,000 to 30,000 are more preferred.

It is undesirable that a polyalkylene oxide having a number average molecular weight of less than 5,000 is used because if so, water-soluble components increase too much, resulting in a large drop of lubricity at the time of repetitive use. It is undesirable that the number average molecular weight exceeds 50,000 because if so, melt viscosity becomes excessively high and therefore compatibility with a water-soluble polyethylene oxide becomes poor, resulting in the drop of lubricity at the time of repetitive use and deterioration of touch feeling.

In particular, the polyalkylene oxide is preferably a polyalkylene oxide having ethylene oxide groups in an amount of 90% by weight or more and having a number average molecular weight of 5,000 to 50,000.

Examples of the diol compound to be used for the present invention include ethylene glycol, diethylene glycol, triethylene glycol, tetraethylene glycol, propylene glycol, dipropylene glycol, trimethylene glycol, 1,3-butanediol, 2,3-butanediol, 1,4-butanediol, 1,5-pentanediol, 1,6-hexanediol, and 1,9-nonanediol. Among these, at least one member selected from the group consisting of ethylene glycol and 1,4-butanediol is optimally used because of being superior in the water absorption ability of a modified polyalkylene oxide to be obtained, suppression of elution of water-soluble components, and stability.

The content of the dial compound is preferably 0.8 to 2.5 molar equivalents, more preferably 1 to 2 molar equivalents, relative to 1 mol of the polyalkylene oxide. It is undesirable that the content of the diol compound is less than 0.8 molar equivalents because if so, water-soluble components increase, so that lubricity will increase, but the lubricity is not maintained sufficiently. It is undesirable that the content of the diol compound exceeds 2.5 molar equivalents because if so, water-soluble components decrease, resulting in little contribution to lubricity.

Examples of the diisocyanate compound to be used for the present invention include compounds having two isocyanate groups (—NCO) in the same molecule, such as 4,4'-diphenylmethane diisocyanate (MDI), 1,6-hexamethylene diisocyanate (HDI), dicyclohexylmethane-4,4'-diisocyanate (HMDI), 3-isocyanatomethyl-3,5,5-trimethylcyclohexyl isocyanate (IPDI), 1,8-dimethylbenzole-2,4-diisocyanate, and 2,4-tolylene diisocyanate (TDI). Among these, at least one member selected from the group consisting of dicyclohexylmethane-4,4'-diisocyanate (HMDI) and 1,6-hexamethylene diisocyanate (HDI) is optimally used because of being superior in compatibility with a water-soluble polyethylene oxide or a thermoplastic resin, suppression of elution of water-soluble components, and stability.

The amount of the diisocyanate compound is determined so that the ratio of the total number of moles of the hydroxyl groups in the polyalkylene oxide and the diol compound to the number of moles of the isocyanate groups in the diisocyanate compound [R value=(the number of moles of —NCO)/(the number of moles of —OH)] may fall within the range of 0.7 to 1.2, preferably 0.8 to 1.05.

It is undesirable that the R value is smaller than 0.7 because if so, the initial lubricity of a resulting modified polyalkylene oxide becomes poor. On the other hand, it is undesirable that the R value exceeds 1.2 because if so, the melt viscosity of a resulting modified polyalkylene oxide is so high that its compatibility with a thermoplastic resin becomes poor.

Examples of the method for reacting a polyalkylene oxide, a diol compound, and a diisocyanate compound together include: a method that includes dissolving them in a solvent and reacting them, a method that includes dispersing them in a solvent and reacting them, and a method that includes mixing them uniformly in a powder form or a solid form and then reacting them by heating to a prescribed temperature. From the industrial point of view, preferred is a method that includes feeding raw materials continuously in a molten state and mixing and reacting them in a multi-screw extruder.

It is also possible to promote the reaction by adding a small amount of triethylamine, triethanolamine, dibutyltin dilaurate, dioctyltin dilaurate, tin 2-ethylhexanoate, triethylenediamine, or the like to the reaction system.

While the thermoplastic resin is not particularly restricted, polyethylene, polypropylene, polystyrene, and high impact polystyrene are preferably used.

The water-soluble polyethylene oxide (A), the modified polyalkylene oxide (B), and the thermoplastic resin (C) are processed into a resin composition, for example, by mixing prescribed amounts of the water-soluble polyethylene oxide, the modified polyalkylene oxide, and the thermoplastic resin by using a mixing machine, such as a Henschel mixer or a blender, or alternatively feeding prescribed amounts of them to a kneader, a roll, an extruder or the like by using a metering feeder or the like, and then melt-mixing them, followed by shaping into a prescribed form, for example, a pellet form.

As an instrument for performing the melt-mixing, a twin-screw extruder, which is superior in ability to mix resins, is preferably used. It is also possible to form the mixture into a desired shape such as a sheet shape, a rod shape or a fibrous shape by performing injection molding or extrusion forming after the melt-mixing.

When performing melt-mixing, it is also permissible to add a stabilizer for preventing decomposition of resins, a UV absorber for improving weather resistance, and a pigment for coloring.

In the present invention, it is preferred to mix 50 to 200 parts by weight of the water-soluble alkylene oxide (A) and 50 to 200 parts by weight of the modified polyalkylene oxide (B) to 100 parts by weight of the thermoplastic resin (C). It is more preferred to mix 80 to 180 parts by weight of the water-soluble alkylene oxide (A) and 80 to 180 parts by weight of the modified polyalkylene oxide (B) to 100 parts by weight of the thermoplastic resin (C).

It is undesirable that the proportion of the water-soluble alkylene oxide is less than 50 parts by weight to 100 parts by weight of the thermoplastic resin because if so, the initial lubricity becomes low; it is undesirable that the proportion of the water-soluble alkylene oxide exceeds 200 parts by weight because if so, the lubricity in repetitive use becomes poor.

It is undesirable that the proportion of the modified polyalkylene oxide is less than 50 parts by weight to 100 parts by weight of the thermoplastic resin because if so, the lubricity in repetitive use becomes poor; it is undesirable that the proportion of the modified polyalkylene oxide exceeds 200 parts by weight because if so, the swelling ratio of the resin composition at the time of immersion in water becomes large and the dimensional stability of the composition becomes poor.

EXAMPLES

The present invention will be described in more detail below by way of examples and comparative examples, but the invention is not limited thereto.

Evaluation Methods

The resin compositions obtained in examples and comparative examples were evaluated in accordance with the following methods.

1. Viscosity Average Molecular Weight of Water-Soluble Polyethylene Oxide

The viscosity average molecular weight of a water-soluble polyethylene oxide is determined using the following viscosity formula.

$$[\eta] = K \times M^a \quad \text{[Numerical Formula 1]}$$

In the above formula, $[\eta]$ represents an intrinsic viscosity, K and a represent coefficients determined according to the kinds of a solvent and a polymer, and M represents a viscosity average molecular weight.

The specific viscosities $\eta^{sp}$ of aqueous solutions having various polymer concentrations c (g/dl) in pure water were measured at 35° C. by using an Ostwald viscometer, and then an intrinsic viscosity $[\eta]$ was calculated by extrapolating a polymer concentration c to 0 on the basis of the relation between a reduced viscosity ($\eta^{sp}/c$), obtained by dividing a specific viscosity by a polymer concentration, and the polymer concentration c. Then, the viscosity average molecular weight of the water-soluble polyethylene oxide was determined by applying $6.4 \times 10^{-5}$ (dl/g) and 0.82 as the values of K and a, respectively, of the polyethylene oxide in pure water.

2. Water Absorption Ability of Modified Polyalkylene Oxide and Proportion of Water-Soluble Component (1) Water Absorption Ability The water absorption ability of a modified polyalkylene oxide is determined by the following method. About 1 [g] of a modified polyalkylene oxide is weighed precisely (A [g]) and then it is immersed in 100 [ml] of ion exchange water at room temperature (22° C.) for 24 hours. Then, a gel is collected by filtration through a wire gauze of 200 meshes (pore size: 75 μm) and its weight (B [g]) is measured, followed by the determination of a water absorption ability (B/A [g/g]).

It is undesirable that the water absorption ability less than 15 [g/g] because if so, wettability becomes low when a resin composition is formed. It is undesirable that the water absorption ability exceeds 40 [g/g] because if so, the proportion of a water-soluble component increases, so that slimy feeling described below increases.

(2) Proportion of Water-Soluble Component

The proportion of the water-soluble component in a modified polyalkylene oxide is determined by the following method. The resulting gel is dried until it comes to have a constant weight (C [g]) in a hot air dryer set at 105° C. and then a proportion of water-soluble component (((A−C)/A)× 100 [%]) is calculated.

3. Physical Properties of Resin Composition

A water-soluble polyethylene oxide, a modified polyalkylene oxide, and a thermoplastic resin were fed to a twin-screw extruder (28φ, L/D=40) set at 240° C., so that a resin composition was obtained. The resulting resin composition was processed into a 1 mm thick sheet with a hot press set at 240° C. and a chip cut therefrom into a size of 2 cm by 5 cm was used for evaluation of physical properties.

(1) Slimy Feeling

After immersing a chip of a resin composition in 100 ml of water, water on its surface was wiped with a paper towel and then the surface was rubbed by a hand to evaluate in accordance with the following evaluation criteria.

Evaluation Criteria

○: No slimy feeling was felt.

Δ: No cobwebbing occurred but slimy feeling was felt.

x: Slimy feeling was felt and cobwebbing occurred.

(2) Mean Coefficient of Friction (MIU) and Range of MIU Deviation (MMD)

After 30 seconds from dropping 0.2 ml of ion exchange water onto a chip of a resin composition, a coefficient of friction μ was monitored under the test conditions given below by using a friction tester (KES-SE, manufactured by KATO TECH CO., LTD.).

Sensor: silicone

Load: 50 [g]

Speed: 5 [mm/sec]

After the first monitoring, water on the surface was wiped off with a paper towel and the chip of the resin composition was dried for 1 hour in an oven of 50° C., followed by second monitoring under the same conditions as those given above. The same operation was repeated until the sixth time, and the coefficient of friction μ was monitored.

(i) Mean Coefficient of Friction (MIU)

The MIU has a correlation with the degree of ease of slipping or resistance to slipping when rubbing the surface. The larger the value is, the more difficult the surface is to slip.

A schematic diagram of determining a mean coefficient of friction (MIU) from the monitored result of the coefficient of friction μ is depicted in FIG. 1.

As illustrated in FIG. 1, a chip of a resin composition is scanned and the coefficient of friction μ is monitored. Next, the coefficient of friction μ is integrated within a monitored width of 20 mm (shadow area of FIG. 1). A mean coefficient of friction (MIU) is calculated by dividing the integral by the monitored width (20 mm).

When the value of MIU is 0.3 or less, it can be said that the slipping property is good.

(ii) Width of Deviation in Mean Coefficient of Friction (MMD)

The MMD has a correlation with smoothness and roughness felt when rubbing the surface. The larger this value is, the rougher the surface is.

Figure 2:
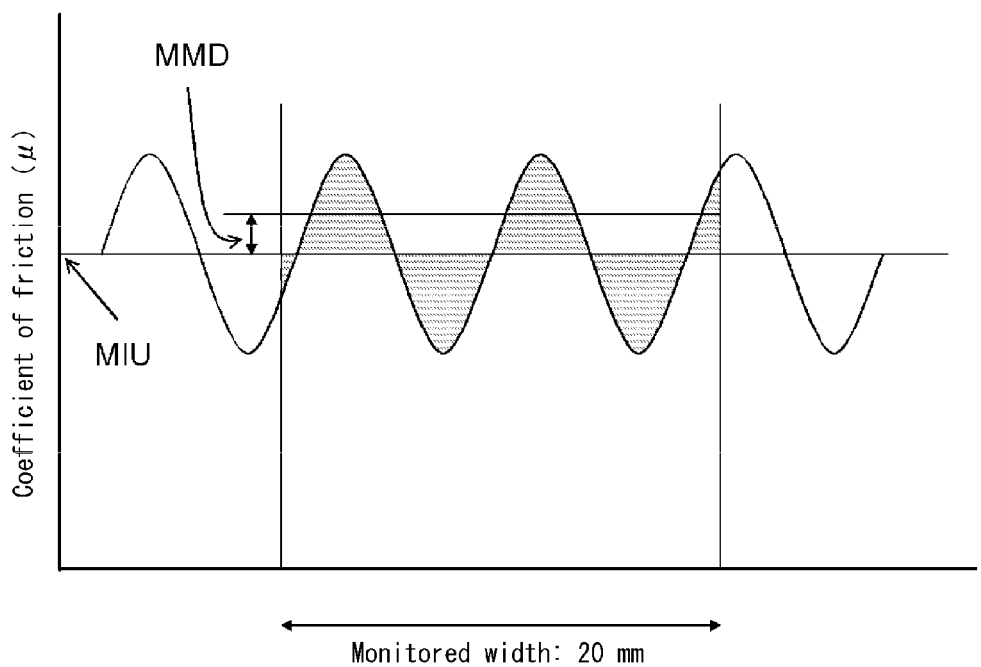
FIG. 2 is a schematic view illustrating a method for determining a deviation in mean coefficient of friction (MMD).

A schematic diagram of determining a deviation in mean coefficient of friction (MMD) from the monitored result of the coefficient of friction is depicted in FIG. 2.

As illustrated in FIG. 2, the absolute value of the difference between the mean coefficient of friction (MIU) and the coefficient of friction μ is integrated within a monitored width of 20 mm (shadow area of FIG. 2). The deviation in mean coefficient of friction (MMD) is calculated by dividing the integral by the monitored width (20 mm).

When the value of MMD is 0.009 to 0.015, it can be said that the smoothness of the surface is good.

(iii) Soft Feeling

The value (MIU/MMD) produced by dividing the MIU by the MMD was used as a parameter of soft feeling. With increase in this value, friction increases and a surface becomes smoother, so that touch feeling becomes softer.

When this value is 20 or more, it can be said that soft feeling is good.

(iv) Retention of Soft Feeling

Moreover, a rate of decrease of (MIU/MMD) values is calculated from the chancre from the first measurement to the sixth measurement and it was defined as soft feeling retention.

Soft feeling retention [%]=[(MIU/MMD)$_6$/(MIU/MMD)$_1$]×100

(MIU/MMD)$_6$: sixth (MIU/MMD) value
(MIU/MMD)$_1$: first (MIU/MMD) value

When the retention is 90% or more, it can be said that initial soft feeling has been maintained well.

Production Example 1: Method for Producing Modified Polyalkylene Oxide

To a storage tank A equipped with a stirrer and held at 80° C. were charged 100 parts by weight of a fully dehydrated polyethylene oxide having a number average molecular weight of 20,000, 0.9 parts by weight of 1,4-butanediol, and 0.1 parts by weight of dioctyltin dilaurate, followed by stirring under a nitrogen gas atmosphere, forming a uniform mixture.

Apart from this, dicyclohexylmethane-4,4'-diisocyanate was charged to a storage tank B held at 30° C. and the tank was stored under a nitrogen gas atmosphere.

To a twin-screw extruder set at 110 to 140° C. were fed continuously with a metering pump the mixture of the storage tank A at a rate of 500 [g/min] and the dicyclohexylmethane-4,4'-diisocyanate of the storage tank B at a rate of 19.4 [g/min]. Mixing and a reaction were carried out in the extruder and then a strand was taken out through the outlet of the extruder and was pelletized by a pelletizer, so that a modified polyalkylene oxide was obtained. The resulting modified polyalkylene oxide had a water absorption ability of 25 [g/g] and a proportion of water-soluble component of 15.5[%].

Production Example 2: Method for Producing Modified Polyalkylene Oxide

To a 40φ single-screw extruder (L/D=40, preset temperature: 90° C.) were fed an ethylene oxide/propylene oxide (=90/10) copolymer having a number average molecular weight of 15,000 at a rate of 250 [g/min] and ethylene glycol heated to 40° C. at a rate of 2.1 [g/min], which were then melt-mixed. The mixture obtained through a discharging opening (the mixture was discharged in a uniform, molten state and it was confirmed by LC analysis that the materials had been mixed in a charged ratio) was fed continuously to a hopper (set at 80° C.) of a 30 φ twin-screw extruder (L/D=41.5). Simultaneously, dioctyltin dilaurate was fed to the hopper of the twin-screw extruder at a rate of 0.5 [g/min].

Apart from this, dicyclohexylmethane-4,4'-diisocyanate adjusted to 30° C. was fed at a rate of 12.4 [g/min] to the screw barrel section located next of the hopper of the twin-screw extruder and a reaction was carried out continuously under a nitrogen atmosphere (preset temperature: 180° C.).

A strand taken out through the outlet of the twin-screw extruder was cooled and then pelletized by a pelletizer, so that a modified polyalkylene oxide was obtained. The resulting modified polyalkylene oxide had a water absorption ability of 20 [g/g] and a proportion of water-soluble component of 11.3 [%].

Production Example 3: Method for Producing Modified Polyalkylene Oxide

To a 40φ single-screw extruder (L/D=40, preset temperature: 90° C.) were fed a polyethylene oxide having a number average molecular weight of 20,000 at a rate of 250 [g/min] and 1,4-butanediol heated to 40° C. at a rate of 1.1 [g/min], and then they were melt-mixed together. The mixture obtained through a discharging opening (the mixture was discharged in a uniform, molten state and it was confirmed by LC analysis that the materials had been mixed in a charged ratio) was fed continuously to a hopper (set at 80° C.) of a 30φ twin-screw extruder (L/D=41.5). Simultaneously, dioctyltin dilaurate was fed to the hopper of the twin-screw extruder at a rate of 0.5 [g/min].

Apart from this, dicyclohexylmethane-4,4'-diisocyanate adjusted to 30° C. was fed at a rate of 6.5 [g/min] to the screw barrel section located next of the hopper of the twin-screw extruder and a reaction was carried out continuously under a nitrogen atmosphere (preset temperature: 180° C.).

A strand taken out through the outlet of the twin-screw extruder was cooled and then pelletized by a pelletizer, so that a modified polyalkylene oxide was obtained. The resulting modified polyalkylene oxide had a water absorption ability of 35 [g/g] and a proportion of water-soluble component of 19.7 [%].

For the modified polyalkylene oxides obtained in Production Examples 1 to 3, diol/polyalkylene oxide molar ratios, R values [(the number of moles of —NCO)/(the number of moles of —OH)], water absorption abilities, and proportions of water-soluble components are given in Table 1.

TABLE 1

| Production Example | Diol/ polyalkylene oxide [molar ratio] | —NCO/—OH | Water absorption ability [g/g] | Proportion of Water-soluble component [%] |
|---|---|---|---|---|
| 1 | 2.0 | 1.00 | 25 | 15.5 |
| 2 | 2.0 | 0.95 | 20 | 11.3 |
| 3 | 1.0 | 0.80 | 35 | 19.7 |

Production Example 4: Method for Producing Cross-Linked Polyacrylate

To a 1-L, four-necked, cylindrical, round-bottomed flask equipped with a stirrer, a reflux condenser, and a nitrogen gas inlet tube was added 550 mL of n-heptane. To this was added and dispersed 1.38 g of hexaglyceryl monobehenate (surfactant; NONION GV-106 produced by NOF Corporation) having an HLB of 13.1, and then the surfactant was dissolved by heating to 50° C., followed by cooling to 30° C.

On the other hand, a 500-mL Erlenmeyer flask was prepared and 92 g of an aqueous acrylic acid solution having a concentration of 80% by weight was added thereto. To this was dropped 152.6 g of an aqueous sodium hydroxide solution having a concentration of 20.1% by weight under external cooling, thereby performing 75 mol % neutralization, and then 0.11 g of potassium persulfate and 0.019 g of ethylene glycol diglycidyl ether as a cross-linking agent were further added thereto and allowed to dissolve. Thereby an aqueous solution of partially neutralized acrylic acid was obtained.

Next, the whole of the aqueous solution of the partially neutralized acrylic acid was added to and dispersed in the above-mentioned four-necked, cylindrical, round-bottomed flask, and the atmosphere in the system was replaced by nitrogen, followed by increasing the temperature and performing a polymerization reaction over 3 hours by keeping the bath temperature at 70° C.

After the completion of the polymerization reaction, the resulting slurry containing a cross-linked salt of polyacrylic acid was dried at 120° C. for 2 hours, so that 191.2 g of the cross-linked salt of polyacrylic acid was obtained. The resulting cross-linked salt of polyacrylic acid had a water absorption ability of 550 [g/g] and a proportion of water-soluble component of 0.06[%].

Example 1

To a twin-screw extruder set at 240° C. (28φ, L/D=40) were fed "PEO8Z" (produced by Sumitomo Seika Chemicals Co., Ltd., viscosity average molecular weight: 2,000,000) as a water-soluble polyethylene oxide in a rate of 6 [kg/hr], the modified polyalkylene oxide obtained in Production Example 1 in a rate of 6 [kg/hr], and 476L produced by BASF A.G. as a high impact polystyrene (HIPS) in a rate of 5 [kg/hr], so that a resin composition was obtained. The ingredients of the resulting resin composition are provided in Table 2.

The resulting resin composition was processed into a 1 mm thick sheet with a hot press set at 240° C. and the sheet was evaluated. The slimy feeling, the MIU, the MMD, the soft feeling, and the retention of the soft feeling are shown in Table 3.

Example 2

To a twin-screw extruder set at 240° C. (28φ, L/D=40) were fed "PEO18Z" (produced by Sumitomo Seika Chemicals Co., Ltd., viscosity average molecular weight: 4,500,000) as a water-soluble polyethylene oxide in a rate of 4 [kg/hr], the modified polyalkylene oxide obtained in Production Example 2 in a rate of 8.5 [kg/hr], and TOYO STYROL GP HRM40 produced by Toyo-Styrene Co., Ltd. as a polystyrene (PS) in a rate of 5 [kg/hr], so that a resin composition was obtained. The ingredients of the resulting resin composition are provided in Table 2.

The resulting resin composition was processed into a 1 mm thick sheet with a hot press set at 240° C. and the sheet was evaluated. The slimy feeling, the MIU, the MMD, the soft feeling, and the retention of the soft feeling are shown in Table 3.

Example 3

To a twin-screw extruder set at 200° C. (28 φ, L/D=40) were fed "PEO15Z" (produced by Sumitomo Seika Chemicals Co., Ltd., viscosity average molecular weight: 3,300,000) as a water-soluble polyethylene oxide in a rate of 6 [kg/hr], the modified polyalkylene oxide obtained in Production Example 1 in a rate of 4 [kg/hr], and J3021GR produced by Prime Polymer Co., Ltd. as a polypropylene (PP) in a rate of 5 [kg/hr], so that a resin composition was obtained. The ingredients of the resulting resin composition are provided in Table 2.

The resulting resin composition was processed into a 1 mm thick sheet with a hot press set at 200° C. and the sheet was evaluated. The slimy feeling, the MIU, the MMD, the soft feeling, and the retention of the soft feeling are shown in Table 3.

Example 4

To a twin-screw extruder set at 180° C. (28 φ, L/D=40) were fed "PEO18Z" (produced by Sumitomo Seika Chemicals Co., Ltd., viscosity average molecular weight: 4,500,000) as a water-soluble polyethylene oxide in a rate of 8 [kg/hr], the modified polyalkylene oxide obtained in Production Example 2 in a rate of 8 [kg/hr], and Sumikathene G801 produced by Sumitomo Chemical Co., Ltd. as a polyethylene in a rate of 10 [kg/hr], so that a resin composition was obtained. The ingredients of the resulting resin composition are provided in Table 2.

The resulting resin composition was processed into a 1 mm thick sheet with a hot press set at 180° C. and the sheet was evaluated. The slimy feeling, the MIU, the MMD, the soft feeling, and the retention of the soft feeling are shown in Table 3.

Example 5

To a twin-screw extruder set at 240° C. (28φ, L/D=40) were fed "PEO18Z" (produced by Sumitomo Seika Chemicals Co., Ltd., viscosity average molecular weight: 4,500,000) as a water-soluble polyethylene oxide in a rate of 8 [kg/hr], the modified polyalkylene oxide obtained in Production Example 3 in a rate of 10 [kg/hr], and 476L produced by BASF A.G. as a high impact polystyrene (HIPS) in a rate of 10 [kg/hr], so that a resin composition was obtained. The ingredients of the resulting resin composition are provided in Table 2.

The resulting resin composition was processed into a 1 mm thick sheet with a hot press set at 240° C. and the sheet was evaluated. The slimy feeling, the MIU, the MMD, the soft feeling, and the retention of the soft feeling are shown in Table 3.

Comparative Example 1

A resin composition was obtained in the same way as that in Example 1 except for using "PEO27" (produced by Sumitomo Seika Chemicals Co., Ltd., viscosity average molecular weight: 7,000,000) as a water-soluble polyethylene oxide, and then it was subjected to evaluation. The ingredients of the resulting resin composition are provided in Table 2.

The slimy feeling, the MIU, the MMD, the soft feeling, and the retention of the soft feeling are shown in Table 3.

Comparative Example 2

A resin composition was obtained in the same way as that in Example 2 except for using "PEO1Z" (produced by Sumitomo Seika Chemicals Co., Ltd., viscosity average molecular weight: 200,000) as a water-soluble polyethylene oxide, and then it was subjected to evaluation. The ingredients of the resulting resin composition are provided in Table 2.

The slimy feeling, the MIU, the MMD, the soft feeling, and the retention of the soft feeling are shown in Table 3.

Comparative Example 3

A resin composition was obtained in the same way as that in Example 3 except for using "PEO27" (produced by Sumitomo Seika Chemicals Co., Ltd., viscosity average molecular weight: 7,000,000) as a water-soluble polyethylene oxide, and then it was subjected to evaluation. The ingredients of the resulting resin composition are provided in Table 2.

The slimy feeling, the MIU, the MMD, the soft feeling, and the retention of the soft feeling are shown in Table 3.

Comparative Example 4

A resin composition was obtained in the same way as that in Example 4 except for using "PEO3Z" (produced by Sumitomo Seika Chemicals Co., Ltd., viscosity average molecular weight: 600,000) as a water-soluble polyethylene oxide, and then it was subjected to evaluation. The ingredients of the resulting resin composition are provided in Table 2.

The slimy feeling, the MIU, the MMD, the soft feeling, and the retention of the soft feeling are shown in Table 3.

Comparative Example 5

To a twin-screw extruder set at 240° C. (28φ, L/D=40) were fed "PEO8Z" (produced by Sumitomo Seika Chemicals Co., Ltd., viscosity average molecular weight: 2,000,000) as a water-soluble polyethylene oxide in a rate of 12 [kg/hr] and 476L produced by BASF A.G. as a high impact polystyrene (HIPS) in a rate of 6 [kg/hr], so that a resin composition was obtained. The resulting resin composition was processed into a 1 mm thick sheet with a hot press set at 240° C. and the sheet was evaluated. The ingredients of the resulting resin composition are provided in Table 2.

The slimy feeling, the MIU, the MMD, the soft feeling, and the retention of the soft feeling are shown in Table 3.

Comparative Example 6

A resin composition was obtained in the same way as that in Example 1 except for using the cross-linked salt of polyacrylic acid of Production Example 4 instead of the modified polyalkylene oxide of Production Example 1. The ingredients of the resulting resin composition are provided in Table 2.

The slimy feeling, the MIU, the MMD, the soft feeling, and the retention of the soft feeling are shown in Table 3.

TABLE 2

| | Water-soluble polyethylene oxide | | | Modified polyalkylene oxide | | Thermoplastic resin | |
|---|---|---|---|---|---|---|---|
| Example | Species | Viscosity average molecular weight | Part(s) | Species | Part(s) | Species | Part(s) |
| Example 1 | PEO8Z | 2,000,000 | 120 | Production Example 1 | 120 | HIPS | 100 |
| Example 2 | PEO18Z | 4,500,000 | 80 | Production Example 2 | 170 | PS | 100 |
| Example 3 | PEO15Z | 3,300,000 | 120 | Production Example 1 | 80 | PP | 100 |
| Example 4 | PEO18Z | 4,500,000 | 80 | Production Example 2 | 80 | PE | 100 |
| Example 5 | PEO18Z | 4,500,000 | 80 | Production Example 3 | 100 | HIPS | 100 |
| Comparative Example 1 | PEO27 | 7,000,000 | 120 | Production Example 1 | 120 | HIPS | |
| Comparative Example 2 | PEO1Z | 200,000 | 20 | Production Example 2 | 120 | PS | 100 |
| Comparative Example 3 | PEO27 | 7,000,000 | 120 | Production Example 1 | 80 | PP | 100 |
| Comparative Example 4 | PEO3Z | 600,000 | 80 | Production Example 2 | 15 | PE | 100 |
| Comparative Example 5 | PEO8Z | 2,000,000 | 120 | — | — | HIPS | 100 |
| Comparative Example 6 | PEO8Z | 2,000,000 | 120 | Production Example 4 | 120 | HIPS | 100 |

TABLE 3

| | Slimy feeling | Mean coefficient of friction (MIU) | | | | | | Deviation in mean coefficient of friction (MMD) | | | | | | Feeling of softness (MIU/MMD) | | Retention [%] |
|---|---|---|---|---|---|---|---|---|---|---|---|---|---|---|---|---|
| | | First time | Second time | Third time | Fourth time | Fifth time | Sixth time | First time | Second time | Third time | Fourth time | Fifth time | Sixth time | First time | Sixth time | |
| Example 1 | ○ | 0.24 | 0.25 | 0.24 | 0.25 | 0.26 | 0.24 | 0.010 | 0.010 | 0.011 | 0.010 | 0.012 | 0.010 | 24.0 | 24.0 | 100 |
| Example 2 | ○ | 0.25 | 0.26 | 0.26 | 0.25 | 0.24 | 0.26 | 0.010 | 0.007 | 0.009 | 0.010 | 0.009 | 0.011 | 25.0 | 23.6 | 95 |
| Example 3 | ○ | 0.23 | 0.23 | 0.24 | 0.23 | 0.23 | 0.24 | 0.010 | 0.011 | 0.011 | 0.011 | 0.011 | 0.011 | 23.0 | 21.8 | 95 |
| Example 4 | ○ | 0.28 | 0.27 | 0.26 | 0.26 | 0.27 | 0.28 | 0.011 | 0.011 | 0.013 | 0.012 | 0.011 | 0.011 | 25.5 | 25.5 | 100 |
| Example 5 | ○ | 0.23 | 0.24 | 0.23 | 0.24 | 0.25 | 0.23 | 0.010 | 0.010 | 0.011 | 0.010 | 0.011 | 0.011 | 23.0 | 20.9 | 91 |
| Comparative Example 1 | x | 0.24 | 0.31 | 0.28 | 0.35 | 0.27 | 0.39 | 0.010 | 0.011 | 0.018 | 0.020 | 0.027 | 0.030 | 24.0 | 13.0 | 54 |
| Comparative Example 2 | Δ | 0.33 | 0.35 | 0.37 | 0.45 | 0.44 | 0.55 | 0.014 | 0.015 | 0.017 | 0.019 | 0.022 | 0.034 | 23.6 | 16.2 | 69 |
| Comparative Example 3 | x | 0.26 | 0.35 | 0.26 | 0.26 | 0.37 | 0.41 | 0.013 | 0.017 | 0.014 | 0.018 | 0.027 | 0.035 | 20.0 | 11.7 | 59 |
| Comparative Example 4 | Δ | 0.34 | 0.35 | 0.38 | 0.38 | 0.41 | 0.41 | 0.014 | 0.016 | 0.017 | 0.018 | 0.021 | 0.031 | 24.3 | 13.2 | 54 |
| Comparative Example 5 | x | 0.25 | 0.25 | 0.26 | 0.28 | 0.30 | 0.33 | 0.010 | 0.011 | 0.016 | 0.019 | 0.018 | 0.025 | 27.0 | 14.8 | 55 |
| Comparative Example 6 | x | 0.27 | 0.27 | 0.33 | 0.36 | 0.38 | 0.42 | 0.010 | 0.011 | 0.024 | 0.027 | 0.035 | 0.040 | 27.0 | 10.5 | 39 |

The invention claimed is:

1. A resin composition comprising a water-soluble polyethylene oxide having a viscosity average molecular weight of 1,000,000 to 6,000,000, a modified polyalkylene oxide, and a thermoplastic resin, wherein the modified polyalkylene oxide is a modified polyalkylene oxide obtained by reacting a polyalkylene oxide, a diol compound, and a diisocyanate compound together,
   wherein the ratio of the water-soluble polyethylene oxide is 80 to 120 parts by mass relative to 100 parts by weight of the thermoplastic resin, and
   wherein the modified polyalkylene oxide has a water absorption ability of 15 to 40 g/g, wherein the water absorption ability is defined as (B)/(A) g/g, wherein (A) is determined by precisely weighing about 1 g of a modified polyalkylene oxide, and (B) is determined by immersing the modified polyalkylene oxide in 100 ml of ion exchange water at room temperature for 24 hours, collecting the polyalkylene oxide by filtration through a wire gauze of 200 meshes, and weighing the polyalkylene oxide.

2. The resin composition according to claim 1, wherein the thermoplastic resin is at least one compound selected from the group consisting of polyethylene, polypropylene, polystyrene, and high impact polystyrene.

3. The resin composition according to claim 1, wherein the ratio of the modified polyalkylene oxide is 50 to 200 parts by mass relative to 100 parts by weight of the thermoplastic resin.

4. The resin composition according to claim 1, wherein in the modified polyalkylene oxide, the amount of the diisocyanate compound is determined so that the ratio of the total number of moles of the hydroxyl groups in the polyalkylene oxide and the diol compound to the number of moles of the isocyanate groups in the diisocyanate compound may fall within the range of 0.7 to 1.2.

5. A resin composition comprising a water-soluble polyethylene oxide having a viscosity average molecular weight of 1,000,000 to 6,000,000, a modified polyalkylene oxide, and a thermoplastic resin, wherein the modified polyalkylene oxide is a modified polyalkylene oxide obtained by reacting a polyalkylene oxide, a diol compound, and a diisocyanate compound together,
   wherein the ratio of he water-soluble polyethylene oxide is 80 to 120 parts by mass, relative to 100 parts by weight of the thermoplastic resin, and
   wherein the modified polyalkylene oxide has a water absorption ability of 15 to 40 g/g, wherein the water absorption ability is defined as (B)/(A) g/g, wherein (A) is determined by precisely weighing about 1 g of a modified polyalkylene oxide, and (B) is determined by immersing the modified polyalkylene oxide in 100 ml of ion exchange water at 22° C. for 24 hours, collecting the polyalkylene oxide by filtration through a pore size of 75 μm, and weighing the polyalkylene oxide.

* * * * *